United States Patent [19]

Chung et al.

[11] Patent Number: 4,612,338
[45] Date of Patent: Sep. 16, 1986

[54] AMINE CAPPED ALIPHATIC POLYEPOXIDE GRIND RESIN FOR USE IN CATHODIC ELECTROCOAT PROCESSES

[75] Inventors: Ding-Yu Chung, Farmington Hills; Tapan K. Debroy, Novi; Michael L. Bartley, Farmington Hills, all of Mich.

[73] Assignee: BASF Corporation, Inmont Divison, Clifton, N.J.

[21] Appl. No.: 723,587

[22] Filed: Apr. 15, 1985

[51] Int. Cl.$^4$ ............................ C09D 3/58; C09D 5/44
[52] U.S. Cl. ..................................... 523/414; 524/901; 204/181.7
[58] Field of Search ................... 523/414; 204/181.7; 524/901

[56] References Cited

U.S. PATENT DOCUMENTS

| | | | |
|---|---|---|---|
| 3,925,180 | 12/1975 | Jerabek | 204/181.7 |
| 3,936,405 | 2/1976 | Sturai et al. | 523/414 |
| 3,962,165 | 6/1976 | Bosso et al. | 523/418 |
| 4,007,154 | 2/1977 | Schimmel et al. | 523/435 |
| 4,081,343 | 3/1978 | Schimmel et al. | 204/181.7 |
| 4,186,124 | 1/1980 | Schimmel et al. | 525/528 |
| 4,230,552 | 10/1980 | Schimmel et al. | 204/181.7 |
| 4,419,467 | 12/1983 | Wismer et al. | 523/414 |
| 4,427,805 | 1/1984 | Kooijmans et al. | 204/181.7 |

Primary Examiner—Ronald W. Griffin
Attorney, Agent, or Firm—Emil Richard Skula

[57] ABSTRACT

A cathodic electrodepositable resin particularly adapted for use as a grind resin to form a pigment paste. The resin is the reaction product of an aliphatic polyepoxide and a polyether primary amine. The resin composition has anti-foaming properties, is stable in the aqueous dispersion, and contributes to high film build.

10 Claims, No Drawings

AMINE CAPPED ALIPHATIC POLYEPOXIDE GRIND RESIN FOR USE IN CATHODIC ELECTROCOAT PROCESSES

DESCRIPTION

1. Technical Field

The field of art to which this invention pertains is epoxy resins, and, more specifically epoxy resin compositions for use as grind resins in cathodic electrocoat processes.

2. Background Art

The use of amine-containing epoxy resins in electrocoat processes is widely known in the art. The cathodic electrodeposition resins are typically manufactured by initially adducting polyepoxide with an amine to form an epoxy/amine adduct. The epoxy/amine adduct may be optionally chain extended with polyols, epoxides, or fatty acids. The adduct is typically blended with a crosslinking agent, and then acid salted to form an aqueous principal emulsion. The aqueous principal emulsion is typically mixed with water and a pigment paste to form an electrodeposition coating bath.

The electrodeposition coating bath is typically contained in an electrically insulated tank containing an anode. An electrically conductive article is connected to a DC electric circuit to act as a cathode. The article is immersed in the coating bath and current is made to flow across the article. As current flows across the article, the electrodepositable resin and crosslinking agent are deposited upon the surfaces of the article. In addition, the pigment paste is also deposited upon the surface of the article. When the desired thickness of film has been produced in the coating bath, the object is removed from the bath and then cured. Typically the curing is accomplished by subjecting the film to sufficient heat in an oven to unblock the crosslinker and crosslink the resin composition thereby producing a smooth, durable electrodeposited coating on the article.

It is known in the art that pigment cannot be incorporated directly into an electrodeposition coating bath for several reasons. First of all, the incorporation of dried pigment into an aqueous bath is difficult in that the pigment tends not to be easily wetted and forms agglomerates rather than a homogeneous dispersion. In addition, the pigment is not stable in the coating bath and tends to settle out. This results in inadequate deposition of pigment in the deposited film. Finally, it is known that in order to achieve good dispersion and good color characteristics dried pigment must be ground down to a very fine particle size. Dry pigment tends to agglomerate due to electrophysical attractive forces between the particles and is usually not acceptable as such for incorporation directly into an electrocoat coating bath. Therefore, it has been common practice to incorporate dry pigment into a special electrodepositable grind resin to form a pigment paste, wherein the pigment is ground down to size while being dispersed in the grind resin, which is then incorporated into an electrodeposition bath.

U.S. Pat. No. 3,925,180 discloses basic nitrogen-containing adducts of glycidyl ethers or esters containing an acrylic hydrocarbon chain of at least eight carbon atoms with a secondary or a tertiary amine salt useful as grinding media in preparing stable pigment dispersions useful in water-soluble coating systems such as electrodepositable compositions; this disclosure is incorporated by reference.

U.S. Pat. No. 3,936,405 discloses quaternary onium salt group-containing epoxy resins particularly useful as grinding media in preparing stable pigment dispersions useful in aqueous electrodeposition coating baths.

U.S. Pat. No. 3,962,165 discloses water dispersible quaternary ammonium salt-containing epoxy resins useful as grind resins in cathodic electrodeposition process.

U.S. Pat. No. 4,007,154 discloses a pigment paste suitable for use in cathodic electrodeposition processes comprising the reaction product of an epoxy-containing organic material and an organic tertiary amine salt containing blocked isocyanate groups.

U.S. Pat. No. 4,186,124 discloses a pigment grinding vehicle for use in aqueous cathodic electrodeposition processes comprising the reaction product of an organic polyepoxide and an organic amine containing an alkylaryl-polyether moiety.

There are differences between a grind resin used in an electrodeposition process and a principal resin including differences in the solubilities of the resins in water, etc. Generally, a principal resin cannot be used as a grind resin in that the dispersion will not be stable, there will be foaming problems, etc.

The disadvantages of the grind resins of the prior art are well known and include the necessity of using large amounts of coalescent solvents with quaternary ammonium salt or tertiary amine salt-containing epoxy resins, foaming in tertiary amine salt-containing aliphatic epoxy resins, etc.

There is a constant search in the art for grind resin vehicles which are easy to work with in that they do not exhibit excessive foaming. In addition, there is a need for grind resin vehicles which are stable with the pigment when in the electrodeposition bath, and which contribute to high film build, i.e., in excess of 1.2 mils.

Accordingly, what is needed in this art is a grind resin which has anti-forming properties, is stable when dispersed in an electrodeposition bath, and which contributes to high film build.

DISCLOSURE OF INVENTION

Cathodic electrodepositable grind resin vehicles are disclosed which are aliphatic polyepoxide based resins exhibiting antifoaming properties, high stability in an electrodeposition bath, and high film build when used in an electrodeposition bath with a principal resin. The resin compositions of this invention are particularly adapted for use as film-forming compositions in a cathodic electrodeposition process as pigment pastes, and comprise:

(a) the reaction product of an aliphatic polyepoxide and a polyether primary amine; and (b) a pigment, wherein the pigment is ground with said reaction product to form the pigment paste, the resin compositions have antifoaming properties, are stable when dispersed in an aqueous electrodeposition coating bath, and produce high film build.

Another aspect of this invention is an aqueous cathodic electrodeposition coating bath comprising water, an acid solubilized amine-containing epoxy resin and crosslinking agent, and a pigment paste, wherein the improvement comprises utilizing as the pigment paste a resin composition, comprising:

(a) the reaction product of an aliphatic polyepoxide and polyether primary amine; and, (b) a pigment,
wherein a pigment and the reaction product are ground to form a pigment paste, the resin composition has antifoaming properties, high stability, and high film build.

Another aspect of this invention is a method of coating articles with a film-forming resin using a cathodic electrodeposition process wherein a cathodic electrodepositable amine-containing epoxy resin is mixed with a crosslinking agent, the resin is then salted with an acid and solubilized to form an emulsion, the emulsion is mixed with a pigment paste and deionized water to form an aqueous coating bath, the bath is contained in an electrically insulated tank containing an anode, an electrically conductive article is connected to a direct current electric circuit to act as a cathode, the article is immersed in the bath and a direct current is passed across the article such that a film of resin and pigment paste is deposited on the surfaces of the article, the object is then removed from the bath and the coating is cured, the improvement which comprises using as the pigment paste a resin composition comprising:
 (a) the reaction product of an aliphatic polyepoxide and a polyether primary amine; and,
 (b) a pigment,
wherein the pigment and reaction product are ground to form the pigment paste, the resin composition has antifoaming properties, high stability and produces high film build.

The foregoing and other features and advantages of the present invention will become more apparent from the following description.

BEST MODE FOR CARRYING OUT THE INVENTION

The aliphatic polyepoxides which can be used to manufacture the resins of this invention include the aliphatic polyepoxides typically used in this art and comprise a resinous material containing at least one epoxy group per molecule.

A particularly useful class of aliphatic polyepoxides are the glycidyl ethers of aliphatic alcohols. Such polyepoxides are manufactured by reacting epichlorhydrin with an aliphatic alcohol. Examples of these polyepoxides include Azepoxide #8 TM (a monoepoxy resin manufactured by AZS Co., Atlanta, Ga.), Epi-Rez 505 TM multifunctional epoxy resin manufactured by Celanese Corp., Louisville, Ky.), and Epi-Rez 5022 TM (a diepoxide resin manufactured by Celanese Corp., Louisville, Ky.).

Another quite useful class of aliphatic polyepoxides are the glycidyl ester manufactured by reacting epichlorhydrin with an aliphatic acid. An example of this type of polyepoxide is Cardura E TM, (a monoepoxy resin manufactured by Shell Chemical Co., Houston Tex.).

The aliphatic polyepoxides used in the practice of this invention will have a molecular weight typically about 150 to about 3,000, more and a particularly preferred embodiment is about 1800.

The polyether primary amines useful in the practice of this invention include polyglycolamine H-163 TM (an alkanalamine manufactured by Union Carbide Corporation, New York N.Y.), diglycolamine TM (an alkanolamine manufactured by Texaco, Houston, Tex.), and Jeffamine M-1000 TM (a polyether monoamine manufactured by Texaco, Houston, Tex.). The polyether primary amines are manufactured by reductive amination of alcohols or reduction of nitriles.

The pigment compositions used to manufacture the pigment pastes of the present invention include those typically used in the art. The pigment compositions may be of any conventional type and are one or more of such pigments as the iron oxides, the lead oxides, strontium chromate, carbon black, titanium dioxide, talc, barium sulfite, barium yellow, cadmium red, chromic green lead silicate, etc.

Sufficient quantities of aliphatic polyepoxide are reacted with sufficient quantities of polyether primary amines at sufficient temperature for a sufficient time to produce a polyepoxide/amine reaction product. Typically, for each epoxide equivalent of the epoxide resin, about 0.5 mole to about 1.5 moles of polyether primary amine are reacted, more typically about 0.8 mole to about 1.2 moles, and preferably about 1.0 mole. Typically, the reaction takes place in a conventional reactor vessel, the temperature is maintained at about 50° C. to about 100° C., more typically about 60° C. to about 90° C., and preferably about 70° C. to about 80° C. The reaction time is typically about 30 minutes to about 240 minutes, more typically about 60 minutes to about 150 minutes, and preferably about 60 minutes to about 120 minutes.

A pigment paste is typically manufactured by mixing a sufficient amount of dry pigment with the grind resin of the present invention and then grinding the mixture for a sufficient period of time in a suitable grinding means to achieve a sufficient particle size reduction.

Suitable grinding means include particle size reduction apparatus conventional in the art such as ball mills, sand mills, shot mills, pebble mills, etc.

The pigment to binder ratio of the pigment paste is typically about 1 to about 10, more typically about 1.5 to about 9, and preferably about 2 to about 6. The grinding time will vary with the apparatus, grind resin, or pigment used. For example, in a ball mill, the time can range from about 2 hours to about 36 hours. The particle size of the pigment after grinding should typically be less than about 4 microns to about 16 microns, more typically less than about 6 microns to about 14 microns, and preferably less than about 8 microns to about 12 microns.

The grind resin is typically acid-salted before admixture with the pigment by adding sufficient quantities of acid to neutralize the amine groups. The acids which are used include the conventional organic acids known in this art such as acetic acid, lactic acid, etc. Typically for each epoxide equivalent about 0.2 to about 1.2 equivalents of acid is added for neutralization.

The grind resin is typically mixed with the pigment prior to grinding as an aqueous dispersion. The pigment is dispersed in the aqueous grind resin dispersion by a conventional mixing means such as a high speed mixer, prior to the grinding operation. Typically the aqueous grind resin dispersion will contain about 10 wt. % to about 90 wt. % solids, more typically about 30 wt. % to about 70 wt. % and preferably about 40 wt. % to about 60 wt. %.

The pigment paste may contain additional components, in addition to the grind resin and pigment, such as surfactants, wetting agents, defoamers, plasticizers, organic coalescent solvents and other components conventional in this art.

An aqueous cathodic electrodeposition coating bath is typically made at the coating site by mixing an aqueous principal emulsion with a pigment paste and deionized water. Additional components may be added to the bath such as coalescent solvents, anticratering agents, flexibilulizing agents, etc.

The principal emulsion is a cathodic electrodepositable amine-containing epoxy resin composition which has been salted to make the composition dispersible in water. The principal resins are well known in the art and are described in various publications such as U.S. Pat. Nos. 3,922,253, 4,225,478 and 4,093,594.

The amount of pigment paste added is sufficient to keep the pigment dispersed in the bath and produce the desired pigment to binder ratio in the finished coating. Typically, the coating bath will contain about 2 wt. % to about 25 wt. % of paste, more typically about 4 wt. % to about 20 wt. %, preferably about 8 wt. % to about 15 wt. %.

The pigment to binder ratio of the deposited coating is typically about 0.10 to about 0.35, more typically about 0.15 to about 0.30, and preferably about 0.20 to about 0.25.

The electrodeposition baths may contain coalescent solvents which are water soluble or partially water soluble organic solvents for the resinous vehicles used in the practice of this invention. The coupling solvents or cosolvents used in the practice of this invention are those typically used and known in the art.

Examples of such coalescent solvents include monomethyl ether ethylene glycol, monoethyl ether ethylene glycol, monobutylether, diethylene glycol monobutylether, ethanol, isopropanol, n-butenol, etc. Sufficient amounts of coupling solvent are used so that a good emulsion resulting in a smooth deposited film is produced. Typically, the amount of coalescent solvent used will be about 0.5 wt. % to about 10 wt. % of the total weight of the coating bath, more typically about 1 wt. % to about 5 wt. %, and preferably about 1 wt. % to about 2 wt. %.

The electrodeposition process typically takes place in an electrically insulated tank containing an electrically conductive anode which is attached to a direct current source. The size of the tank will depend on the size of the article to be coated. Typically, the tank is constructed of stainless steel or mild steel lined with a dielectric coating such as epoxy impregnated fiberglass or polypropylene. The electrodepositable cathodic resinous coating compositions of this invention are typically used to coat articles such as automobile or truck bodies. The typical size of an electrodeposition bath tank used for this purpose is about 60,000 gallons to about 120,000 gallons.

Typically, the article to be coated is connected to the direct current circuit so that the conductive object acts as the cathode. When the article is immersed in the coating bath, flow of electrons from the cathode to the anode, that is, conventional current flow from the anode to the cathode, results in the particles of the dispersed cationic electrodepositable resin composition being deposited on the surfaces of the article. The particles of the dispersed resin composition are positively charged and are therefore attracted to the negative cathodic surface of the object to be coated. The thickness of coating deposited upon the object during its residence in the electric cathodic coating bath is a function of the cathodic electrodepositable resin composition, the voltage across the article, the current flux, the pH of the coating bath, the conductivity, the residence time, etc. Sufficient voltage will be applied to the coated article for a sufficient time to obtain a coating of sufficient thickness. Typically, the voltage applied across the coated article is about 50 volts to about 500 volts, more typically about 200 to about 350 volts, and preferably about 225 volts to about 300 volts. The current density is typically about 0.5 ampere per sq. ft. to about 30 amperes per sq. ft., more typically about one ampere per sq. ft. to about 25 amperes per sq. ft., and preferably about one ampere per sq. ft. The article to be coated typically remains in the coating bath for a sufficient period of time to produce a coating or film of sufficient thickness, having sufficient resistance to corrosion and flexibility. The residence time or holding time is typically about 1 minute to about, 3 minutes, more typically about 1 minute to about 2½ minutes, and preferably about 2 minutes.

The pH of the coating bath is sufficient to produce a coating which will not rupture under the applied voltage. That is, sufficient pH to maintain the stability of the coating bath so that the resin does not kick-out of the dispersed state and to control the conductivity of the bath. Typically, the pH is about 4 to about 7 more typically about 5 to about 6.8, and preferably about 6 to about 6.5.

The conductivity of the coating bath will be sufficient to produce a coated film of sufficient thickness. Typically the conductivity will be about 800 micro mhos to about 3,000 micro mhos, more typically about 800 micro mhos to about 2,200 micro mhos, and preferably about 900 micro mhos to about 1,800 micro mhos.

The desirable coating thicknesses are sufficient to provide resistance to corrosion while having adequate flexibility. Typically, the film thicknesses of the coated objects of this invention will be about 0.4 mil to about 1.8 mils, more typically about 0.6 mil to about 1.6 mils, and preferably about 1.2 mils to about 1.4 mils.

The temperature of the coating bath is preferably maintained through cooling at a temperature less than about 86° F.

When the desired thickness of the coating has been achieved the coated object is removed from the electrodeposition bath and cured. Typically, the electrodeposited coatings are cured in a conventional convection oven at a sufficient temperature for a sufficient length of time to unblock the blocked polyisocyanates and allow for crosslinking of the electrodepositable resin compositions. Typically, the coated articles will be baked at a temperature of about 200° F. to about 600° F., more typically about 250° F. to about 290° F., and preferably about 225° F. to about 275° F. The coated articles will be baked for a time period of about 10 minutes to about 40 minutes, more typically about ten minutes to about 35 minutes, and preferably about 15 minutes to about 30 minutes.

It is contemplated that the coated articles of the present invention may also be cured by using radiation, vapor curing, contact with heat transfer fluids, and equivalent methods.

The smoothness of the cured coating is a function of the "flow" of the deposited coating composition. Flow is defined as the tendency of the electrodeposited coating composition to liquify during the curing operation and form a smooth cohesive film over the surface of a coated article prior to the onset crosslinking.

Typically the coated articles of this invention will comprise conductive substrates such as metal, including steel, aluminum, copper, etc., however, any conductive substrate having a conductivity similar to the aforementioned metals may be used. The articles to be coated may comprise any shape so long as all surfaces can be wetted by the electrodeposition bath. The characteristics of the article to be coated which have an effect on the coating include the shape of the article, the capacity of the surfaces to be wetted by the coating solution, and the degree of shielding from the anode. Shielding is defined as the degree of interference with the electromotive field produced between the cathode and the anode, thereby preventing the coating composition from being deposited in those shielded areas. A measure of the ability of the coating bath to coat remote areas of the object is throwpower. Throwpower is a function of the electrical configuration of the anode and cathode as well as the conductivity of the electrodeposition bath.

It should be noted that the articles which are coated by the coating compositions of this invention are typically automobile bodies which have been pretreated to remove impurities and contaminants in a phosphotizing bath.

The following examples are illustrative of the principles and practice of this invention, although not limited thereto. Parts and percentages where used are parts and percentages by weight.

EXAMPLE A

The grind vehicle was prepared by adding the following components to a suitable reactor vessel: 2280 parts of Epi-Rez 505 TM (WPE=600) manufactured by Celanese Corporation, Louisville, Ky., to a mixture of 331 parts of monobutyl ethylene glycol ether, and 619 parts of polyglycolamine H-163, at 77° C. for 1.5 hour. The reaction temperature was held at 115° C. for one hour.

EXAMPLE B

The following components were charged into a suitable reactor vessel: 1658 parts of Epon 828 having an epoxy equivalent weight of 188; 473 parts of Bisphenol A; 583 parts of ethoxylated Bisphenol A having a hydroxy equivalent weight of 230 (Synfac 8009 from Milliken Chemical Co.); and 147 parts of toluene. The charge was heated to 145° C. under a dry nitrogen blanket and 3.8 parts of benzyl dimethyl amine were added to the reactor vessel. The reaction mixture was further heated to 160° C., and held for 45 minutes. An additional 5.4 parts of benzyl dimethyl amine were added, and the mixture was held at 150° C. until the desired WPE was achieved, then 1037 parts of toluene were added to the reactor to dilute the resulting adduct B.

EXAMPLE C

A conventional reactor equipped with an agitator, thermometer, nitrogen line and a condensor was charged with 900 parts of diethylene triamine. The diethylene triamine was slowly heated to 140° C. Then, 2869 parts of the adduct B were slowly added to the reactor during a one-hour time period. After the adduct B was completely charged, the mixture was heated to 180° F. and held for one hour. Next, the excess amine in the reactor mixture was vacuum distilled, condensed and removed by applying a vacuum of 75 mmHg and slowly raising the temperature of the reactor charge to 500° F. over a 2.5 hour time period. The mixture was held at this temperature until no more distillate was coming out. The temperature was then lowered to 360° F. and 283 parts of Pelargonic acid along with 200 parts of xylene were added to the reactor. The resulting mixture was heated to 360° F. and held at reflux until the acid value was down to 6. Then the reaction mixture was cooled down to ambient temperature.

EXAMPLE D

The crosslinker was prepared by slowly charging 870 parts of trimethylopropane into a reactor vessel containing 3387 parts of an 80/20 isomer mixture of 2,4-/2,6-toluene diisocyanate, 1469 parts of methyl isobutyl ketone, and 2 parts of dibutyl tin dilaurate under agitation with a nitrogen blanket. The reaction was maintained at a temperature below 110° F. The charge was held an additional one and one-half hours at 110° F. and then heated to 140° F., at which time 2026 parts of ethylene glycol monopropyl ether were added. The charge was maintained at 210° F. to 220° F. for one and one-half hour until essentially all of the isocyanate moiety was consumed as indicated by infrared scan. The batch was then thinned with 2116 parts of methyl isobutyl ketone.

EXAMPLE E

An acrylic anticratering agent was prepared by charging 44 parts of butyl acrylic, 15 parts of hydroxyethyl acrylic, 15 parts of dimethylaminoethyl methacrylic, 2 parts of styrene, 1 part of octyl mercaptan, 4 parts of VAZO 67, and 3 parts of acetone to a refluxing mixture of 13 parts of methyl isobutyl ketone and 2 parts of acetone over a four-hour period. After a 15 minute holding period, 0.14 parts of VAZO 67 and 1 part of methyl isobutyl ketone were added. The batch was maintained at the refluxing temperature for another hour.

EXAMPLE F

The principal emulsion was prepared by adding 324 parts of the adduct of Example C, 172 parts of the crosslinker of Example D, 10 parts of the acrylic flow agent of Example E, 17 parts of propylen glycol monophenyl ether to 227 parts of deionized water and 7 parts of acetic acid under high agitation for one hour. An additional 246 parts of deionized water was added. After agitation for 3 days, organic solvents were driven off.

EXAMPLE G

A pigment paste was prepared by grinding 123 parts of the grind vehicle of Example A, 8 parts of acetic acid, 252 parts of deionized water, 4 parts of dibutyl tin oxide, 17 parts of carbon black, 56 parts of lead silicate, and 145 parts of clay in a suitable mill for about one-half hour until the average particle size was less than about 12 microns, (at ambient temperature).

EXAMPLE H

A dispersion suitable for electrodeposition composed of 2020 parts of the emulsion of Example F, 380 parts of the pigment paste of Example G, and 1101 parts of deionized water was mixed in a suitable mixing vessel. The dispersion had a pH of 5.9 and a total solids content of 25%. A phosphated steel panel electrocoated at 300 volts for two minutes gave a smooth film of 1.2 mil thickness after a 325° F. bake for 25 minutes.

The grind resins of this invention exihibit antifoaming properties during grinding and during processing when incorporated into a pigment paste as part of cathodic electrodeposition bath. The grind resins produce high stability cathodic electrodeposition coating baths and contribute to high film build of the deposited coating.

Although this invention has been shown and described with respect to the detailed embodiments thereof, it will be understood by those skilled in the art that various changes in form and detail thereof may be made without departing from the spirit and scope of the claimed invention.

We claim:

1. A resin composition particularly adapted for use as a film-forming composition in a cathodic electrodeposition process, comprising:
   a. the reaction product of an aliphatic polyepoxide and a polyether primary amine; and,
   b. a pigment, wherein the pigment and the reaction product are ground together to form a pigment paste, the resin composition has antifoaming properties, high stability, and produces high film build.

2. The resin composition of claim 1 wherein the aliphatic polyepoxide is selected from the group consisting of glycidyl ethers or esters of polyfunctional alcohols, and glycidyl esters of polyfunctional acids.

3. The resin composition of claim 1 wherein the polyether primary amine is selected from the group consisting of ethoxylated primary amines and propoxylated primary amines.

4. An aqueous cathodic electrodeposition coating bath comprising water, an acid solubilized amine-containing epoxy resin particularly adapted for use as a film-forming composition in an electrodeposition process, a crosslinking agent, and a pigment paste wherein the improvement comprises utilizing as the pigment paste composition, comprising:
   a. the reaction product of an aliphatic polyepoxide and a polyether primary amine; and,
   b. a pigment, wherein a pigment and the reaction product are ground together to form a pigment paste, the resin composition has antifoaming properties, high stability, and produces high film build.

5. The coating bath of claim 4 wherein the aliphatic polyepoxide is selected from the group consisting of glycidyl ethers or esters of polyfunctional alcohols, and glycidyl esters of polyfunctional acids.

6. The coating bath of claim 4 wherein the polyether primary amine is selected from the group consisting of ethoxylated primary amines and propoxylated primary amines.

7. A method of coating articles with a film-forming resin using a cathodic electrodeposition process wherein a cathodic electrodepositable amine-containing epoxide resin particularly adapted for use in a film-forming composition in an electrodeposition process is mixed with a crosslinking agent, the resin is then salted with an acid to form an emulsion, the emulsion is mixed with a pigment paste and water to form an aqueous coating bath, the bath is contained in an electrically insulated tank containing an anode connected to a DC circuit, an electrically conductive article is connected to the DC circuit to act as a cathode, the article is immersed in the bath and current is passed across the article, a film of resin and pigment paste is deposited on the surfaces of the article, the article is removed from the bath and the film is cured to a smooth durable coating, wherein the improvement comprises using as the pigment paste a resinous composition comprising:
   a. the reaction product of an aliphatic polyepoxide and a polyether primary amine; and
   b. a pigment, wherein the pigment and reaction product are ground together to form a pigment paste, the resin composition has antifoaming properties, high stability and produces high film build.

8. The method of claim 7 wherein the aliphatic polyepoxide is selected from the group consisting of glycidyl ethers or esters of polyfunctional alcohols, and glycidyl esters of polyfunctional acids.

9. The method of claim 7 wherein the polyether primary amine is selected from the group consisting of ethoxylated primary amines and propoxylated primary amines.

10. A coated article manufactured by the method of claims 7, 8 or 9.

* * * * *